(12) United States Patent
Danielsson et al.

(10) Patent No.: US 9,384,529 B2
(45) Date of Patent: Jul. 5, 2016

(54) FLIGHT DATA DISPLAY

(75) Inventors: Torkel Danielsson, Linköping (SE); Jan Håkegård, Linköping (SE); Anders Gripsborn, Ljungsbro (SE); Jörgen Larsson, Linköping (SE); Anders Pettersson, Linköping (SE)

(73) Assignee: SAAB AB, Linkoeping (SE)

( * ) Notice: Subject to any disclaimer, the term of this patent is extended or adjusted under 35 U.S.C. 154(b) by 465 days.

(21) Appl. No.: 14/000,004

(22) PCT Filed: Feb. 17, 2011

(86) PCT No.: PCT/SE2011/050175
§ 371 (c)(1),
(2), (4) Date: Sep. 26, 2013

(87) PCT Pub. No.: WO2012/112090
PCT Pub. Date: Aug. 23, 2012

(65) Prior Publication Data
US 2014/0063037 A1 Mar. 6, 2014

(51) Int. Cl.
*G08B 21/00* (2006.01)
*G06T 5/00* (2006.01)
(Continued)

(52) U.S. Cl.
CPC ............... *G06T 5/00* (2013.01); *G08G 5/0021* (2013.01); *G09G 5/00* (2013.01); *G01C 1/00* (2013.01); *G09G 1/00* (2013.01)

(58) Field of Classification Search
CPC .................... G01C 1/00; G09G 1/00
See application file for complete search history.

(56) References Cited

U.S. PATENT DOCUMENTS

| 4,954,818 A | 9/1990 | Nakane et al. |
| 2003/0034901 A1 | 2/2003 | Griffin, III |

(Continued)

FOREIGN PATENT DOCUMENTS

| EP | 0439873 A1 | 8/1991 |
| EP | 1675395 A1 | 6/2006 |

(Continued)

OTHER PUBLICATIONS

International Searching Authority, International Search Report and Written Opinion for International Application No. PCT/SE2011/050175, Nov. 11, 2011, 10 pages, Swedish Patent and Registration Office, Sweden.

(Continued)

*Primary Examiner* — Shirley Lu
(74) *Attorney, Agent, or Firm* — Alston & Bird LLP

(57) ABSTRACT

The invention pertains to a display method, a computer program for performing steps of the display method and a display system. The display system (1) comprising: display means (2) comprising: a physical display unit (13) operable to display flight data, a display processing device (11), a graphics driver and a graphics processing device, fault detection means arranged to detect at least one fault condition associated to the display means (2). The display processing device is arranged to process a first task set associated to a normal operation mode and in parallel process a second task set associated to an emergency operation mode, wherein said display processing device is arranged to transmit information provided from the second task set to the graphics processing device in response to the detected at least one fault condition.

16 Claims, 4 Drawing Sheets

(51) Int. Cl.
*G08G 5/00* (2006.01)
*G09G 5/00* (2006.01)
*G01C 1/00* (2006.01)
*G09G 1/00* (2006.01)

(56) References Cited

U.S. PATENT DOCUMENTS

| | | | |
|---|---|---|---|
| 2004/0158370 A1* | 8/2004 | Le Draoullec | G05D 1/0055 701/31.6 |
| 2008/0068399 A1 | 3/2008 | Goss et al. | |
| 2008/0262664 A1 | 10/2008 | Schnell et al. | |
| 2010/0182165 A1* | 7/2010 | Barry | G01C 23/00 340/971 |

FOREIGN PATENT DOCUMENTS

| | | |
|---|---|---|
| EP | 1762825 A2 | 3/2007 |
| WO | WO 84/01655 A1 | 4/1984 |
| WO | WO 00/68887 A1 | 11/2000 |
| WO | WO 2004/102520 A1 | 11/2004 |
| WO | WO 2004/111816 A2 | 12/2004 |
| WO | WO 2009/081650 A1 | 7/2009 |
| WO | WO 2009/081682 A1 | 7/2009 |
| WO | WO 2010/036128 A2 | 4/2010 |
| WO | WO 2011/099905 A1 | 8/2011 |
| WO | WO 2014/062102 A1 | 4/2014 |

OTHER PUBLICATIONS

Lefebvre, Y. "Mastering the ARINC 661 Standard", In proceedings of SAE 2011 AeroTech Congress and Exhibition, AEROTECH 2011; Toulouse; France; Oct. 18, 2011 through Oct. 21, 2011; 23 pages, [retrieved on Dec. 1, 2014] Retrieved from the Internet: <URL: www.edstechnologies.com/Mailer/jan12/PF3.pdf>.

Verhoeven, R., et al., "Prototyping Interactive Cockpit Applications", In proceedings of 23rd Digital Avionics Systems Conference, Oct. 2004, pp. 9.A.3-1-9.A.3-10, vol. 2, IEEE, USA.

Airlines Electronic Engineering Committee, "Cockpit Display System Interfaces To User Systems ARINC Specification 661-2", Jun. 30, 2005, 308 pages, retrieved from URL:http://read.pudn.com/downloads111/ebook/462188/ARINC661-2005.pdf on May 20, 2016, Aeronautical Radio, Inc., U.S.A.

Barboni, E., et al., "Model-Based Engineering of Widgets, User Applications and Servers Compliant with ARINC 661 Specification", *Interactive Systems, Design, Specification, And Verification*, Jul. 26, 2006, 25 pages, Springer, Germany.

* cited by examiner

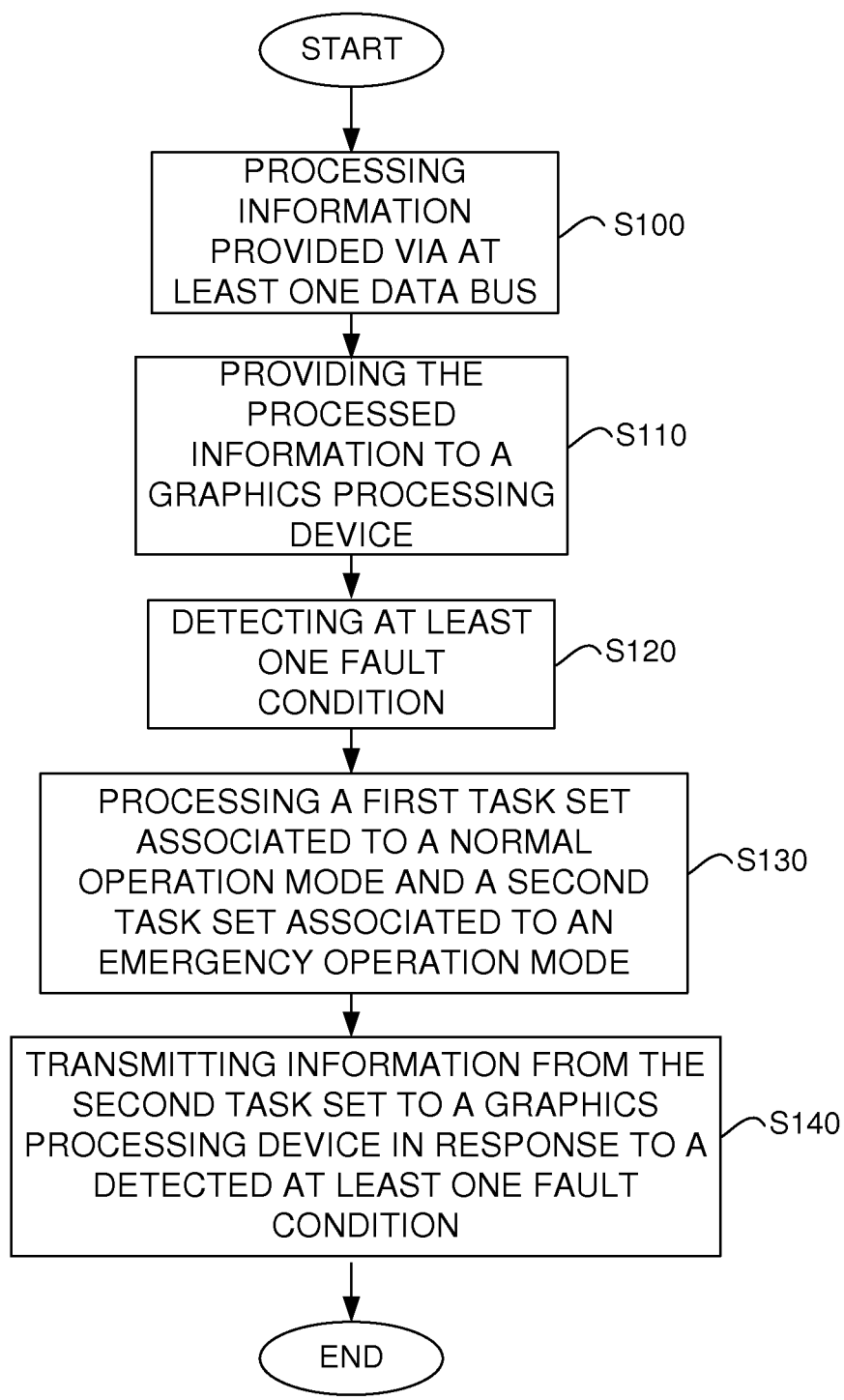

FLIGHT DATA DISPLAY

CROSS REFERENCE TO RELATED APPLICATIONS

This application is a national stage application, filed under 35 U.S.C. §371, of International Application No. PCT/SE2011/050175, filed Feb. 17, 2011, the contents of which is hereby incorporated by reference in its entirety.

BACKGROUND

1. Related Field

The present invention relates to a system and a method for a vehicular display system.

The present invention relates in particular to a system and a method for a vehicular display system associated to avionics.

Furthermore, the invention relates to software adapted to perform steps of the display method when executed on a computer.

2. Description of Related Art

In control systems of today, developments in digital technology have enabled complex functionality. However as a direct result from the development, the need of additional system capacity and functionality provided by software and various components such as sensors, processors, display systems, data buses and memory units is increasing.

Real-time systems for critical control applications, wherein typically data from sensor/s are acquired, communicated and processed to provide a control signal to an actuator pose strict demands regarding bandwidth, data delivery time, redundancy, fail-safety and integrity. Failure to meet one or several of these demands can in applications including "brake-by-wire" or "steer-by-wire" prove potentially dangerous.

One such area wherein reliable high-speed real-time execution and communication of data is of outmost importance is within avionics systems. Advances in technology during late 1960 and early 1970 made it necessary to share information between different avionics subsystems in order to reduce the number of functional modules. A single sensor such as a position sensor provided information to for example weapon systems, display system, autopilot and navigation system.

The possibilities gained by the development within the field of computer technology have also increased the amount of processed data available to a pilot containing situation awareness information, relevant for decision making. This in combination with presentation of flight critical data, related to for example navigation, adds to the number of interactive presentations that are necessary and/or desired to provide in a cockpit display system.

Operating an aerial vehicle based on interacting with avionics arranged to control the operations of the aerial vehicle in a safe fashion typically require access to the flight critical data such as for example data associated to an altimeter, attitude indicator, heading indicator, and airspeed indicator. Operators typically depend upon the flight critical data and data provided from other instruments to provide the information necessary for controlling the aerial vehicle under all stages of flight. Access to the flight critical data is particularly important during operations when visibility is limited and when the pilot does not have a horizon, a view of land, or any other visual references. Hence, a failure to provide the flight critical data to the operator during any stage of flight could prove disastrous. In order to assure safe operations of the aerial vehicle the display system typically comprise some sort of built in redundancy mechanism to enable displaying the flight critical data in the event of a failure of the display system.

However, the display systems according to prior art tends to require complex redundancy configurations in order to provide for an operator interacting with avionics via the display systems in a safe fashion.

Accordingly, there is a need to present improvements in the art of avionics and displays.

BRIEF SUMMARY

It is therefore an objective of the present invention to provide a system, a method and a computer program performing said method, that require less hardware to implement and which improves safety concerning a display system i.e. an interface between an operator and avionics.

This objective is achieved according to the present invention by a display system for interaction between an operator and at least one subsystem of a vehicle via at least one data bus. The display system comprising: display means comprising: a physical display unit operable to display flight data, a display processing device arranged to process information provided via the at least one data bus related to a set of display attributes associated to a set of displayable entities associated to the flight data, a graphics driver and a graphics processing device, wherein the display processing device is arranged to interface with the graphics processing device via the graphics driver so as to generate a voltage signal to drive the physical display unit. The display system further comprises fault detection means arranged to detect at least one fault condition associated to the display system. The display processing device is arranged to process a first task set associated to a normal operation mode and in parallel process a second task set associated to an emergency operation mode and wherein said display processing device is arranged to activate the emergency operation mode by transmitting information provided from the second task set to the graphics processing device in response to the detected at least one fault condition.

By this is achieved a system wherein redundancy can be assured without using additional hardware by processing two task sets associated to a normal operation mode and an emergency mode in one display control computer. Hence, malfunctions resulting from software associated to the display system or parts of hardware associated to the system can be handled without using back-up hardware.

The system is in one option further characterized in that said graphics driver comprise configurable bits arranged to determine a client data priority associated to each of the first and second task set, wherein the client data priority associated to the second task set is configured to be higher than the client data priority associated to the first task set.

By this is achieved a system wherein it can be assured that the information provided from processing the second task set associated to the emergency operation mode is the only information transmitted to the graphics processing device in response to the detected at least one fault condition.

The system is in one option further characterized in that the first task set is arranged to interface with the graphics driver by providing information via said second set task set and wherein the second task set is arranged to transmit the information provided from the first task set to the graphics driver and wherein the second task set comprise at least one task arranged to discard the information provided from the first task set in response to the detected at least one fault condition.

The system is in one option further characterized in that the first task set is arranged to perform compilation of the set of displayable entities based on display configuration information stored on a display memory unit and the information provided via the at least one data bus and wherein the second task set is arranged to perform compilation of a subset of the set of displayable entities based on display configuration information stored on the display memory unit and the information provided via the at least one data bus.

The system is in one option further characterized in that the display means comprise physical activation means arranged to activate and/or de-activate the emergency operation mode in response to activation input information provided from an operator of the display system.

By this is achieved a system wherein an operator of the system can determine by visual inspection if there exist at fault condition in the display system and act accordingly in order to activate the emergency operation mode.

The system is in one option further characterized in that the physical activation means is arranged to be directly coupled to display processing device and wherein the physical activation means are arranged to directly provide activation input information to the second task set.

By this is achieved a system wherein malfunction due to a fault condition associated to communication of activation information can be handled.

The system is in one option further characterized in that the display processing device is arranged to process the first task based on information provided from the control computer via the at least one data bus and to process the second task set based on information provided from the control computer device via a separate communication channel.

By this is achieved a system wherein a malfunction due to a fault condition associated to communication of data from the control computer using the at least one data bus can be handled.

The system is in one option further characterized in that display means are arranged to display a minimal display representation corresponding to the subset of the set of displayable entities comprising at least one display representation selected from a group comprising at least an altimeter, an attitude indicator, a heading indicator, and an airspeed indicator in the emergency operation mode.

By this is achieved a system wherein visualization of a minimum number of display indicators corresponding to flight critical data necessary for controlling the aerial vehicle under all stages of flight always can be displayed by the display system.

The system is in one option further characterized in that the display means comprise a partitioning operating system arranged to divide memory and CPU time among statically allocated partitions in a fixed manner so that each partition has a certain amount of memory and CPU time allocated to it, and in that the first task set and second task set are arranged to be processed in separated partitions.

By this is achieved a system wherein isolation between first and second task set can be assured in order to avoid a fault condition associated to the first task set to propagate and affect the functioning of the second task set.

The system is in one option further characterized in that display system is conformant with ARINC 661 specifications.

This objective is also achieved according to the present invention by a method for interaction between an operator and at least one subsystem of a vehicle via at least one data bus, the method comprising the steps of: processing in a display processing device information provided via the at least one data bus related to a set of display attributes associated to a set of displayable entities associated to flight data, providing the processed information to a graphics processing device via a graphics driver so as to generate a voltage signal to drive a physical display unit to display the flight data, detecting at least one fault condition in the display system. The method step of: processing in the display processing device information provided via the at least one data bus comprises processing a first task set associated to a normal operation mode and in parallel processing a second task set associated to an emergency operation mode, and wherein the method comprise the further step of: transmitting information provided from the second task set to the graphics processing device in response to the detected at least one fault condition.

The dependent claims define optional characterizing features corresponding to those described in relation to the system.

This objective is also achieved by a computer program comprising a program code for performing the above described method steps, when said computer program is run on a computer.

This objective is also achieved by a computer program product comprising a program code stored on a computer readable media for performing the above described method steps, when said computer program is run on the computer.

This objective is also achieved by a computer program product directly storable in an internal memory of a computer, comprising a computer program for performing the above described method steps, when said computer programme is run on the computer.

BRIEF DESCRIPTION OF THE FIGURES

FIG. 4. shows a flow diagram of a method for controlling the vehicular display system according to an example of the present invention.

DETAILED DESCRIPTION OF VARIOUS EMBODIMENTS

Typically in display systems according to prior art redundancy is handled using back-up hardware and software. The present invention presents a novel display system, method and computer program for facilitating designing display system for critical display application requiring redundancy without the use of additional hardware requiring less complex configuration, with resulting lower cost and weight.

The following examples relates to the case where a display system is described with reference to aerial vehicles. However, various different applications are possible, e.g. for use in land, sea or space vehicles.

Figure 1:
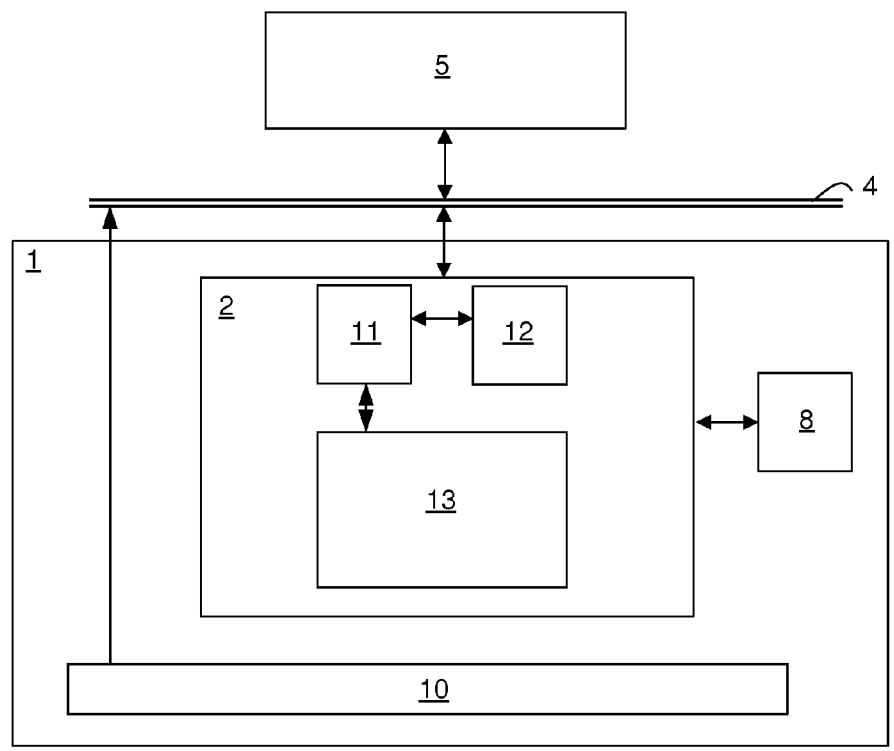
FIG. 1. shows schematically a block diagram of a vehicular display system according to an example of the present invention.

With reference to the drawings and initially to FIG. 1 a flight display system 1, adapted to be mounted in an aerial vehicle is provided. The flight display system 1 comprises at least one flight display 2 arranged to provide means for at least one operator of said flight display system to interact with systems and/or subsystems associated to the aerial vehicle, in order to supervise and control the operation of the aerial vehicle. The flight display system is arranged with built-in redundancy to provide safe operation of the system in case of a malfunction associated to the display system. The built-in redundancy allows the display system to operate in one of two operational modes corresponding to a normal operation mode and an emergency operation mode. The normal operation mode may provide a full display representation of flight data using different display indicators when the flight display system is determined to be fully functional. The emergency operation mode may provide a minimal display representation of flight data using different display indicators when the flight display system exhibits one or more malfunctions. The features of the two operational modes will be explained in more detail below.

In the shown example with further reference to FIG. 1, the flight display system may comprise at least one flight display 2, such as at least one multi functional display unit (MFDU). The at least one flight display 2 comprise at least one display processor 11 such as for example a central processing unit (CPU) arranged to process data, received via at least one communication bus 4. The at least one flight display comprises a power supply (not shown) arranged to provide power to various components of the flight display. As an example the power supply may comprise one or more outputs comprising an alternating current (AC) or a direct current (DC) such as for example a 28V DC output or a 5V AC output. The processing of the received data in the display processor 11 can be based on configuration data stored in a memory 12, coupled to the display processor 11 via a backplane (not shown). The at least one communication bus 4 may be bi-directional and based on protocols such as the Institute of Electrical and Electronics Engineers (IEEE) Ethernet, IEEE 1394 Firewire, MIL-STD-1553, Aeronautical Radio, Incorporated (ARINC) 664, ARINC 429, ARINC, Small Computer Systems Interface (SCSI), Recommended Standard (RS)232, RS422 or other protocols known in the art or any combination thereof. The received data may be data transmitted from systems and/or subsystem of the aerial vehicle comprising devices such as for example sensors, remote data concentrators (RDC:s), video processing units (VPU:s), and/or at least one flight control computer (FCC) 5 arranged to control functions of the aerial vehicle such as propulsion, flight controls, payload, hydraulics and power. The received data may be related to properties of displayable entities. The received data may comprise for example a parameter associated to a sensor reading, a position of an actuator and/or a location received by an ADS-B transponder.

The flight display system 1 comprises a fault detection module 8 and/or software routines arranged to detect at least one fault condition associated to the display system 1. More details on the fault detection module 8 and/or software routines will be explained below.

In one example the flight display may comprise an input/output I/O data processing device (not shown) such as for example at least one data bus interface adapter arranged to provide data traffic processing associated to data to be transferred from the flight display and data to be received by the flight display.

Figure 2:
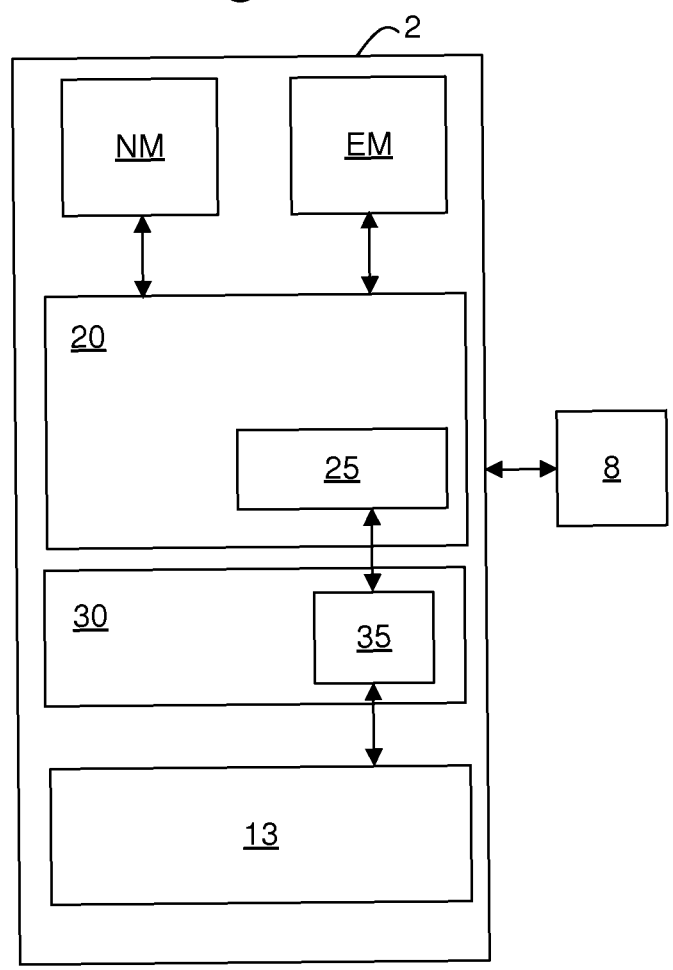
FIG. 2. shows schematically software and hardware architecture of a vehicular display system according to an example of the present invention.

In one example with reference to FIG. 2, the at least one display processor 11 being part of module hardware 30 of the flight display 2 may be arranged to orchestrate a Module Operating System (MOS) 20. The MOS 20 may be arranged to provide a set of services to enable orchestrating one or more applications within the flight display. The set of services may for example relate to providing the one or more applications with services related to communication, scheduling, memory management, and timing. In providing the services the module operating system may be arranged to interact with module hardware 30 associated to the flight display by means of a hardware interface system. The hardware interface system may comprise a set of interface drivers arranged to provide access to specific module hardware 30 such as for example the memory 12, the at least one display processor 11 and a graphics processing unit 35 or any other hardware of the flight display 2. The set of interface drivers may for example comprise at least a graphics driver 25. The set of interface drivers also referred to as the set device drivers is a set computer routines allowing higher-level computer programs such as the one or more applications to interact with one or more module hardware device.

The one or more applications arranged to be orchestrated by the display processor 11 of the flight display may be arranged to perform operations relating to generating graphics. The operations relating generating graphics include compiling data received from the at least one communication bus 4 in order to provide one or more display representation. The one or more display representation may for example be compiled by processing at least one application of the one or more applications within the flight display based on data received from the at least one communication bus and based on configuration data stored on the memory 12. The configuration data may for example determine a visual appearance of one or more flight display representations. The mentioned configuration data and flight display representations will be explained in more detail below. Each application of the one or more applications deployed in the flight display may comprise one or more tasks, also referred to as processes. Each of the one or more tasks may denote a logical unit of computation with a single thread of control.

In one example with further reference to FIG. 2 the flight display may comprise a graphics processing unit (GPU) 35 arranged to perform graphics computations. As an example the graphics processing unit may be arranged to perform operations relating to vector and/or raster graphics generation or other types of graphics processing operations known in the art. The processing of the GPU 35 may be arranged to be performed on data resulting from processing the one or more applications in the display processor 11. The GPU 35 may be arranged to receive data from the display processor via a suitable connector to a system bus arranged to interconnect various components associated to the module hardware 30. The suitable connector may for example be AGP, PCI or PCI-Express. Output data resulting from the operations of the GPU may be transmitted to a physical display surface 13 coupled to the flight display via a suitable connection to the GPU. The suitable connection to the physical display surface may be a pixel bus. As an example the suitable connection between the display surface and the GPU may a low voltage differential signalling interface (LVDS), digital visual interface (DVI), video graphics array (VGA), high definition multimedia interface (HDMI), DisplayPort or other suitable types of connections known in the art. The output data provided from the GPU may be one or more generated voltage signals corresponding to a display representation. The one or more generated voltage signals is arranged to drive the physical display surface causing the physical display surface to display the display representation corresponding to the one or more generated voltage signals.

In one example the module operating system 20 arranged to be orchestrated by the flight display is a partitioning operative system. The partitioning operative system is arranged to divide memory and CPU time associated to the flight display. The partitioning process may be applied to other hardware resources associated to the flight display. The partitioning process can also be referred to as "brick-wall partitioning". One or more partitions can be set up for each part of the system wherein each partition has a certain amount of memory and CPU time slice allocated to it. Each partition is limited to its initial fixed memory allocation. The initial fixed memory and CPU-time allocation for a partition can neither be increased nor decreased after the initial system configuration. Each partition may be assigned with multiple threads or processes, or both, if the operating system supports them. As an example the operating system may be arranged to support time partitioning. In this example the time partitioning may be arranged to be fixed. In case the operative system is an ARINC 653 compliant partitioning system assigned with three partitions and a total major allocation of 40 ms per cycle, a fixed cyclic scheduler could be set to run the first partition for 10 ms, then the second partition for 20 ms, and then the third for 40 ms.

In one example the one or more applications arranged to be processed by the display processor 11 may be partitioned using a partitioning operative system as the module operative system. The one or more applications with their associated tasks or set of tasks may be partitioned based on which functionality the respective tasks are arranged to perform.

In one example a first task set NM associated to at least a first application of the one or more of applications arranged to be processed by the display processor 11 may be arranged in a first partition associated to the flight display 2. The first task set is associated to a normal operation mode. The first task set NM associated to the normal operation mode is arranged to perform compilation of received data from the at least one communication bus 4 based on a first flight data display representation. The first flight data display representation may be configured based on first configuration data associated to the first partition. Thus, when operating the flight display system 1 in the normal operation mode, data provided from processing the first task set is fed to the GPU via the interface driver 25 to cause the display surface 13 to display the corresponding flight data representation.

A second task set EM associated to at least a second application of the one or more of the number of applications arranged to be processed by the display processor 11 may be arranged in a second partition associated to the flight display 2. The second task set is associated to an emergency operation mode. The second task set EM associated to the emergency operation mode is arranged to perform compilation of received data from the at least one communication bus 4 based on a second flight data display representation also referred to as a back-up display representation. The second flight data display representation may be configured based on second configuration data associated to the second partition. The emergency operation mode is arranged to be activated in case a fault condition exists in the flight display causing a malfunction and/or in case an operator of the flight display experiences a malfunction associated to the flight display. Thus, when operating the flight display system 1 in the emergency operation mode, data provided from processing the second task set is provided to the GPU via the interface driver 25 to cause the display surface to display the corresponding back-up flight data representation.

In one example the second task set comprises different tasks than the first task set.

In one example one or more tasks of the second task set may comprise one or more tasks that are substantially identical to one or more tasks of the first task set. As an example the one or more tasks of the second task set that are substantially identical to the one or more tasks of the first task set may be programmed using a different programming language and/or different logic operators.

In one example a major execution schedule associated to the first and second task sets may be provided. The major execution schedule determines the amount of CPU time associated to each of the first and second task set and periodic instants of time determining when to process each of the first and second task set during a periodically repeating major time cycle. In one example, the major execution schedule may be arranged to determine that both the first and second task sets are arranged to be processed in parallel during each of the periodically repeating major time cycle. The term in parallel is used to denote that both the first and second task set is arranged to be processed for at least one time slice each during each major time cycle. However, the at least one time slice for processing the first and second task set may occur at different instants of time during the major time cycle.

In one example, in case the flight display 2 is operated in the normal operation mode data, provided from processing the second task set associated to the emergency operation mode may be arranged to be buffered on the memory unit associated to the flight display 2 for a period of time.

In one example, one or more tasks or task sets of the one or more applications arranged to be processed by the display processor 11 that are associated to I/O data processing may be partitioned into a dedicated I/O partition.

In one example the fault detection module 8 and/or fault detection software routines of the flight display system 1 is arranged to perform various system status test procedures in order to detect at least one fault condition associated to the display system 1. The fault detection module 8 may be coupled directly to the flight display 2. The fault detection software routines may be arranged to be processed by the display processor 11 or any other additional suitable processing device. The fault detection module 8 and/or fault detection software routines may be arranged to perform various monitoring operations relating to data received in the flight display, data provided by processing the number of applications in the flight display, and/or execution data such as for example execution timing associated to processing the number of applications. Examples of such monitoring are cyclic redundancy checks (CRC), data range tests, watchdog timing, wiring fault detection, application task monitoring and or other monitoring process known in the art.

As an example the at least one fault condition may comprise deadlocks, race conditions, wiring faults, power outage, invalid data received from the at least one communication bus 4. The at least one fault condition may for example arise due one or more of the following reasons: bird strike, fire, combat, component wear, hardware resource depletion, software error.

In one example the fault detection module and/or fault detection software routines are arranged to transmit information to the flight display 2 in response to detecting at least one fault condition. The information transmitted to the flight display 2 may comprise information indicating that there exists a fault condition in the flight display system 1.

In one example, in response to receiving information indicating that there exists a fault condition in the flight display system 1 the flight display 2 may be arranged to activate the emergency operation mode. Activation of the emergency operation mode may cause the flight display 2 to transmit information provided from processing the second task set to the GPU instead of transmitting information provided from processing the first task set to the GPU.

In one example, the flight display 2 may be arranged to stop and re-initialize processing of the first task set in response to receiving information relating to the detected at least one fault condition provided from the fault detection module and/or fault detection software routine.

In one example the fault detection module and/or fault detection software routines may be arranged to detect that a previously detected fault condition associated to the flight display system 1 has ceased to exist. In case the fault detection module and/or fault detection software routines detects that the previously detected at least one fault condition has ceased to exist, the fault detection module and/or fault detection software routines may be arranged to transmit information to the flight display 2 that the previously detected at least one fault condition has ceased to exist. In response to receiving the information relating to that the previously detected at least one fault condition has ceased to exist the flight display may be arranged to de-activate the emergency operation mode and cause the flight display to operate in normal operation mode. De-activation of the emergency operation mode may include transmitting information provided from processing the first task set to the GPU instead of transmitting information provided from processing the second task set to the GPU.

In one example the fault detection module and/or fault detection software routines is arranged to be implemented in an ARINC 653 partition arranged to be orchestrated by the display processor 11. As an example the second task set EM may be arranged to comprise the fault detection software routines.

In one example the interface driver 25 associated to the GPU 35 may be a multi-client interface driver. The multi-client interface driver may be arranged to receive data provided from a plurality of interface client applications such as for example the data provided from a first interface client corresponding to the first task set and data provided from a second interface client corresponding to the second task set. The multi-client interface driver comprises one or more configuration bits arranged to determine an interface client data priority level associated to each of the interface client applications. The term interface client application herein denotes which of the one or more application arranged to interface with the interface driver. The interface client data priority level indicates from which client data is to be provided to the GPU for processing in case more than one interface client transmits data to the interface driver simultaneously and/or substantially simultaneously. The configuration bits may be configured during initialization of the flight display 2.

In one example the client data priority level is configured to be higher for the second interface client than the first interface client. Thus, in case data is provided to the interface driver from both the first and second interface clients, only data from the second interface client is processed by the GPU so as to cause the physical display surface 13 to display a flight data display representation corresponding to processed data of the second interface client. In response to receiving information from the fault detection module and/or fault detection software routine that there exists at least one fault condition in the flight display system 1 the second task set may be arranged to perform transmission of the information provided from processing the second task set to the multi-client interface driver.

In one example, in response to receiving information relating to that the previously detected at least one fault condition has ceased to exist in the flight display the second task set may be arranged to stop transmitting information to the GPU via the multi-client interface driver associated to the GPU.

In one example the interface driver associated to the GPU is a single-client interface driver. In this example the first task set performs transmissions of processed data to the interface driver associated to the GPU via the second task set. The second task set may be arranged to discard data provided from the first task set in response to a detected at least one fault condition.

In one example the display processor 11 is arranged to process the received data based on the configuration data stored in the memory 12 so as to instantiate displayable entities. Further, the display processor 11 is in one example arranged to modify properties associated to the displayable entities on basis of the received data.

The displayable entities may be a number of predefined graphical elements, and/or grouping elements. The displayable entities may further be static, dynamic and/or interactive. Examples of displayable entities may be lines, arcs, text, rectangles, containers and pushbuttons. The interactive displayable entities may comprise a plurality of internal states such as in the case of the pushbutton which may comprise several graphically different states related to the when the button is in idle state, subjected to a marker passing such as a mouse-over or engaged by said marker.

As an example, a composition of the displayable entities may form a graphical representation of an altitude meter. The graphical representation of the altitude meter indicator may comprise a plurality of graphical objects such as a circle with a plurality of evenly distributed ticks, each crossing the circle perpendicularly and associated numbering, providing an altitude scale. A pointer may be arranged to point from the centre of the circle to the current altitude provided by received data in accordance with the scale. The property of the above defined displayable entity may be related to altitude, provided from the FCC 5, which may be arranged to perform subsequent sensor readings of current altitude. Other properties of the displayable entities may be related to colouring, size and positioning.

The at least one FCC 5 may be arranged to provide data via the at least one communication bus 4 at a periodic basis and/or based on detected events, such as event relating to when subsequent data exceed predetermined thresholds.

The communication bus 4, may in one example be a switched Ethernet network. The switched Ethernet network may comprise one or more data switches. The topology of the Ethernet network may for example be a dual redundant topology comprising two data switches and thereby also comprise two independent data paths along which data may be communicated to each device attached to the network.

In one example the communication bus 4 may be a switched Ethernet network arranged in broadcast mode, based on implementing broadcast address.

In one example the communication bus 4 may be a switched Ethernet network arranged in point-to-multipoint mode based on implementing at least one multicast address.

The configuration data stored in the memory 12 comprises predetermined information relating to predetermined display content, configuration of the display content and information relating to a communication protocol. The configuration data may further comprise information related to information for interpretation of the received data such as a rendering engine. In one example the rendering may be based on OpenGL.

In one example, the physical display surface 13 is for example a liquid crystal display (LCD), organic light emitting diode (OLED), cathode ray tube (CRT) or any other suitable display surface technique known in the art.

In one example the at least one physical display surface 13 may depending on intended use and/or physical properties be configured as a head mounted display (HMD), head down display (HDD), head up display (HUD), side display (SD), data link control display unit (DCDU) or any other suitable display technology known in the art.

In one example the flight display 2 comprises at least one physical display surface 13 arranged in a vehicle control station such as in a cockpit of the aerial vehicle.

In another example one flight display 2 may be arranged in a front cockpit and an additional flight display (not shown) may be arranged in a rear cockpit of a two seated aerial vehicle.

The flight display 2 is further configured to receive user inputs via the communication bus 4 from an operator of the avionics control system by means of at least one user interface 10. The user interface is for example at least one keyboard, mouse, joystick, trackball, bezel key, rotary knob or a combination thereof. The at least one physical display surfaces 13 may further comprise a resistive or capacitive touch screen layer to enable user interactions.

The flight display 2 may further be arranged to forward received user inputs to the FCC 5, in order for the FCC 5 to respond to user inputs. As an example the operator may detect that a parameter associated with a sensor reading of a specific engine component exceeds a predetermined temperature threshold and respond accordingly, by providing a command counteracting the condition. The counteracting command comprises for example providing an actuator of an engine cooling system with a command to increase cooling efficiency.

In one example the flight display 2 may be assigned to visualising a primary flight display (PFD) or Navigation display (ND). The PFD may be arranged to visualize indicators relating to characteristics of the aerial vehicle hosting the control system 1, such as for example air speed, attitude, altitude and/or magnetic heading. The ND may be arranged to visualize indicators relating to characteristics of the aerial vehicle hosting flight display, such as for example map, flight path and other aerial vehicles detected in the surrounding air space.

In another example at least one of the flight displays 2 may be assigned to simultaneously visualising both a PFD and a ND.

In one example explained with reference to FIG. 3, the at least one display processor 11 of the flight display may be arranged to process a predetermined library of displayable entities and a number of configuration files, also referred to as definition files, stored in the memory 12. The predetermined library of displayable entities may comprise a predetermined list of displayable entities with associated descriptions relating to graphic appearance and behaviour. The definition files may each comprise configuration information relating to a selection of displayable entities to instantiate with associated initial properties. Each of the definition files may comprise information describing the displayable entities, constituting each of a set of layers L1-L3, displayable in the at least one physical display surface 13 of the flight display 2. By processing the definition files, a set of layers L1-L3 each comprising one or more specific instances of the displayable entities may be provided in the physical display surface 13. A number of display client systems C1-CN may be arranged to handle the logic of the displayable entities. The handling of the logic may comprise determining and providing the parameters associated to the properties of the instantiated displayable entities during system run-time. As an example one or more of the display client systems C1-CN may be arranged to provide one or more of the instantiated displayable entities with properties related to sensor readings or positions of actuators. As an example, the logic of one of the display client systems C1-CN may be arranged to alter colour of one of its associated instantiated displayable entities upon detection of an intruding aerial vehicle breaching a proximity threshold. Each of the number of display client system C1-CN may be associated to one or more of the layers L1-L3. Each of the layers L1-L3 may be associated to one of the display client systems C1-CN.

It is to be understood that the exemplified number of layers L1-L3, available to the flight display system 1 is by no means limited to three. The flight display system 1 may as well comprise at least as many of the layers as the corresponding number of available display client systems C1-CN, determined to have a need for displaying information.

In one example the definition files may be created using the format extensible mark-up language (XML), on basis of the ARINC 661 specifications. The definition files may further be compiled from the XML format to binary and subsequently uploaded to the memory 12 of the flight display 2.

In one example the predetermined library of displayable entities may be based on the widget library as defined by the ARINC 661 specifications.

In one example the definitions of the client systems C1-CN may be based on user applications (UA) as defined by the ARINC 661 specifications.

Typically avionics subsystems, such as sensors, actuators, controllers and display units communicate with each other using standardized communication protocols. The commercial Aeronautical Radio Inc. (ARINC) 661, specification is a civil protocol standard for the definition of a cockpit display system and its communication with a client system arranged to manage avionics functions. Each independent client system is provided with a separate layer of a display surface. The protocol provides a safe implementation for several independent client systems to simultaneously present data on a single display surface of display system. Furthermore implementation of the ARINC 661 facilitates software certification in accordance with the Radio Technical Commission for Aeronautics (RTCA) DO-178B guidance document. Software re-certification resulting from system modifications such as additions of new client systems or modifications to the existing client systems is also facilitated.

In one example a display server can be provided in the flight display 2. The display server may provide a set of services related to handling of user input data, instantiating displayable entities and handling of hierarchy of the displayable entities on basis of the configuration data. The display server may be implemented in software executed on the at least one display processor 11 of the flight display 2. The operating instructions for the display server may be provided by information stored on the memory 12.

In one example the display server is implemented as the first task set or portions thereof.

In one example the emergency operation mode can be arranged to modify the appearance of displayable entities of the flight display 2.

The emergency mode may be arranged to modify the appearance of the flight display 2 to correspond to a minimum set of flight data indicators and supervision functions required for continued vehicular operation, in case of a display failure. The emergency mode may further be arranged to modify the appearance of displayable entities of a least one of the flight displays 2 irrespective of the visible display objects prior to activation.

In one example the minimal display representation corresponding to the minimum set of flight data indicators may comprise at least one display representation selected from a group comprising at least an altimeter, an attitude indicator, a heading indicator, and an airspeed indicator.

Figure 3:
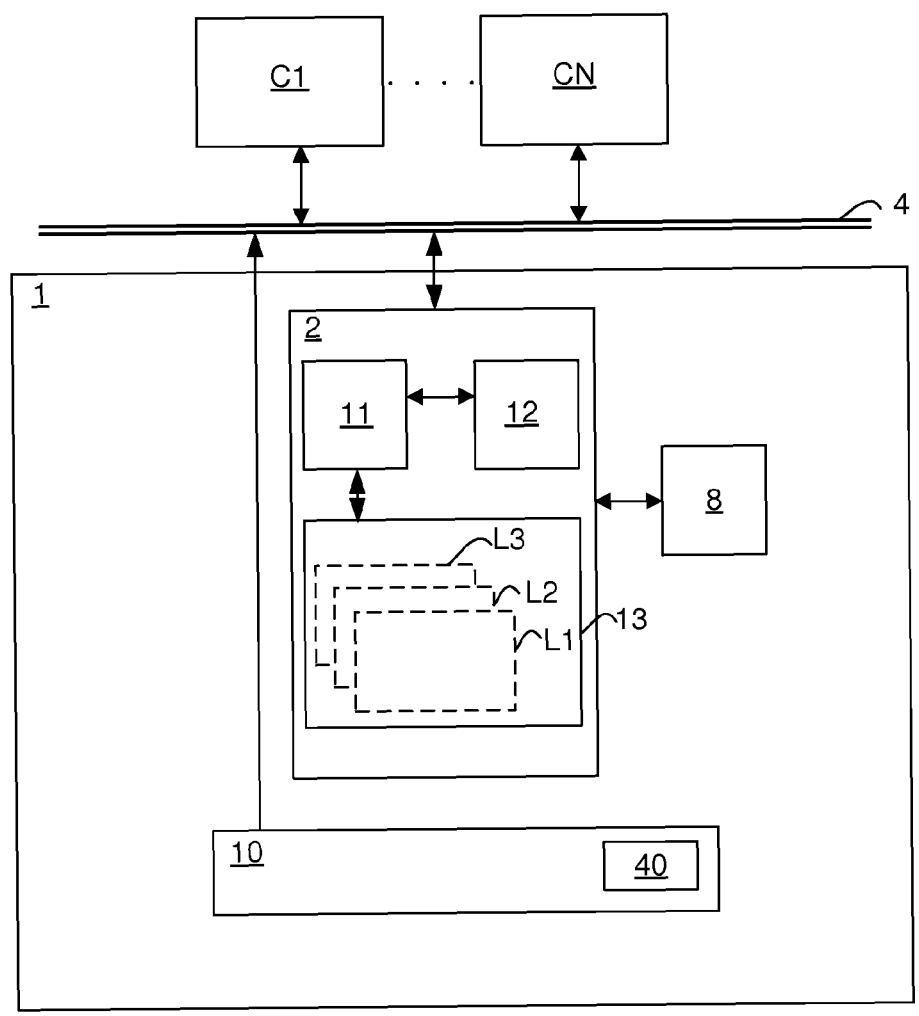
FIG. 3. shows schematically a block diagram of a vehicular display system according to an example of the present invention.

With further reference to FIG. 3 the emergency mode can manually be activated by a pilot pressing an activation button 40 in response to detecting failure of the flight display 2. Alternatively the emergency mode may be activated automatically by the fault detection module and/or fault detection software routine detecting a fault condition as mentioned above.

In one example the activation button 40 may be arranged to enable manually de-activating the emergency mode EM. As an example the operation of pressing the activation button 40 may be arranged to cause a transition from the normal mode NM to the emergency mode EM when the flight display is operated in normal mode NM and to cause a transition from the emergency mode EM to the normal mode NM when the flight display is operated in the emergency mode EM.

In one example a separate de-activation button may be arranged to cause a transition from the emergency mode EM to the normal mode NM when the flight display is operated in the emergency mode EM.

In one example the flight display may comprise the activation button 40 or the fault detection module and/or fault detection software routines, in order to enable activation of the emergency mode EM.

In one example the flight display may comprise the activation button 40 and the fault detection module and/or fault detection software routines to enable activation of the emergency mode EM, by using either the activation button 40 or the fault detection module and/or fault detection software routines.

In one example the activation button 40 may be directly coupled to the flight display 2 and arranged to provide information directly to the second task set EM. Thus the information can be provided directly to the second task set without being transmitted via the at least one communication bus 4.

In one example the emergency operation mode i.e. second task set may be provided with a separate communication link to associated avionics subsystems of the aerial vehicle providing flight data necessary to provide the minimum set of flight data indicators for enabling display of control and supervision functions. The separate communication link may be point to point links such as RS-485 or ARINC 429.

In one example the emergency operation mode i.e. second task set may be provided with a separate communication link to additional components associated to the flight display such as for example user interface (the at least one keyboard, mouse, joystick, trackball, bezel key, rotary knob) and/or one or more light sensors coupled to the flight display system 1 arranged to determine light conditions in the cockpit in order to safely control a suitable level of backlighting and/or night vision mode (NVIS) associated to the physical display surface.

In one example, one or more of the components coupled to the flight display system 1 may be configured to be compatible with industry standard specifications such as the ARINC 661, cockpit display interface specifications.

In one example the display processor 11 may comprise a non-volatile memory, a data processing device such as a microprocessor and a read/write memory. The non-volatile memory has a first memory portion wherein a computer program, such as an operating system, is stored for controlling the function of the flight display system 1. Further, the display processor 11 comprises a bus controller, a serial communication port, I/O-means, an A/D-converter, a time date entry and transmission unit, an event counter and an interrupt controller. The non-volatile memory also has a second memory portion.

A computer program comprising routines for controlling the flight display system 1 of an aerial vehicle is provided. The program may be stored in an executable manner or in a compressed state in a separate memory and/or in the read/write memory.

When it is stated that the data processing device performs a certain function it should be understood that the data processing device performs a certain part of the program which is stored in separate memory, or a certain part of the program which is stored in read/write memory.

The data processing device may communicate with a data port by means of a first data bus. The non-volatile memory is adapted for communication with the data processing device via a second data bus. The separate memory is adapted to communicate with data processing device via a third data bus. The read/write memory is adapted to communicate with the data processing device via a fourth data bus.

When data is received on the data port it is temporarily stored in the second memory portion. When the received input data has been temporarily stored, the data processing device is set up to perform execution of code in a manner described above. According to one example, data received on the data port comprises information regarding properties associated to instances of displayable entities provided from for example the flight control computer 5 and/or configuration data from the memory storage device 12 and/or information provided from the fault detection module and/or fault detection software routine relating to a detected at least one fault condition. This information can be used by the display processor 11 so as to provide a flight display 2 with updated parameters associated with properties of instantiated displayable entities and to provide activation of emergency operation mode.

An example of the invention relates to a computer programme comprising a programme code for performing the method steps depicted with reference to FIG. 4, when the computer programme is run on a computer.

An example of the invention relates to a computer programme product comprising a program code stored on computer-readable media for performing the method steps depicted with reference to FIG. 4, when the computer programme is run on the computer.

An example of the invention relates to a computer programme product directly storable in an internal memory of a computer, comprising a computer programme for performing the method steps depicted with reference to FIG. 4, when the computer programme is run on the computer.

FIG. 4 schematically illustrates an example of a method for displaying flight data in a vehicular display system. This example relates to provide a flight display system 1 with means to be operated in a normal mode and in an emergency mode.

In a first method step S100 information provided via the at least one data bus 4 is processed in a display processor 11. This means that information related to a set of display attributes associated to a set of displayable entities associated to flight data is processed. After the method step S100 a subsequent method step S110 is performed.

In the method step S110 the processed information is provided to a graphics processing 35 device via a graphics driver 25. In more detail the information is provided to the graphics processing unit so as to generate a voltage signal to drive a physical display unit 13 to display the flight data. After the method step S110 a subsequent method step S120 is performed.

In the method step S120 at least one fault condition is detected in the display system 1. After the method step S120 a subsequent method step S130 associated to the method step s110 is performed.

In the method step S130 a first task set NM associated to a normal operation mode and a second task set EM associated to an emergency operation mode is processed in parallel in the display processor 11. After the method step S130 a subsequent method step S140 is performed.

In the method step S140 information provided from the second task set EM is transmitted to the graphics processing device 35 in response to the detected at least one fault condition. After the method step S130 the method ends.

In one example in the method step S120 the at least one fault condition is detected manually by an operator of the display system 1. The at least one fault condition may be detected by the operator by means of visual inspection. The operator may respond to the detected at least one fault condition by pressing an activation button 40 to provide indication of a detection of at least one experienced fault condition.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A display system for interaction between an operator and at least one subsystem of a vehicle via at least one data bus, the display system comprising:
   display means comprising:
      a physical display unit operable to display flight data;
      a display processing device configured to process information provided via the at least one data bus related to a set of display attributes associated to a set of displayable entities associated to the flight data;
      a graphics driver and a graphics processing device, wherein the display processing device is configured to interface with the graphics processing device via the graphics driver so as to generate a voltage signal to drive the physical display unit; and
   fault detection means configured to detect at least one fault condition associated to the display system, wherein:
      the display processing device is configured to process a first task set associated to a normal operation mode and in parallel process a second task set associated to an emergency operation mode; and
      said display processing device is configured to activate the emergency operation mode by transmitting information provided from the second task set to the graphics processing device in response to the detected at least one fault condition.

2. The display system according to claim 1, wherein:
   said graphics driver comprises configurable bits arranged to determine a client data priority associated to each of the first task set and the second task set; and
   the client data priority associated to the second task set is configured to be higher than the client data priority associated to the first task set.

3. The display system according to claim 1, wherein:
   the first task set is configured to interface with the graphics driver by providing information via said second set task set;
   the second task set is configured to transmit the information provided from the first task set to the graphics driver; and
   the second task set comprise at least one task arranged to discard the information provided from the first task set in response to the detected at least one fault condition.

4. The display system according to claim 1, wherein:
   the first task set is configured to perform compilation of the set of displayable entities based on display configuration information stored on a display memory unit and the information provided via the at least one data bus; and
   the second task set is configured to perform compilation of a subset of the set of displayable entities based on display configuration information stored on the display memory unit and the information provided via the at least one data bus.

5. The display system according to claim 4, wherein display means are configured to display a minimal display representation corresponding to the subset of the set of displayable entities.

6. The display system according to claim 5, wherein the minimal display representation is selected from a group consisting of an altimeter, an attitude indicator, a heading indicator, and an airspeed indicator in the emergency operation mode.

7. The display system-according to claim 1, wherein the display means comprise physical activation means configured to at least one of activate or de-activate the emergency operation mode in response to activation input information provided from an operator of the display system.

8. The display system according to claim 7, wherein:
   the physical activation means is configured to be directly coupled to the display processing device; and
   the physical activation means are configured to directly provide the activation input information to the second task set.

9. The display system according to claim 1, wherein the display processing device is configured to process the first task based on information provided from the control computer via the at least one data bus and to process the second task set based on information provided from the control computer device via a separate communication channel.

10. The display system according to claim 1, wherein:
    the display means comprise a partitioning operating system configured to divide memory and CPU time among statically allocated partitions in a fixed manner so that each partition has a certain amount of memory and CPU time allocated to it; and
    the first task set and the second task set are configured to be processed in separated partitions.

11. The system display system according to claim 1, wherein the system is conformant with ARINC 661 specifications.

12. A method for interaction between an operator and at least one subsystem of a vehicle via at least one data bus, the method comprising the steps of:
    processing in a display processing device information provided via the at least one data bus related to a set of display attributes associated to a set of displayable entities associated to flight data;
    providing the processed information to a graphics processing device via a graphics driver so as to generate a voltage signal to drive a physical display unit to display the flight data; and
    detecting at least one fault condition in the display system, wherein:

the step of processing in the display processing device information provided via the at least one data bus comprises processing a first task set associated to a normal operation mode and in parallel processing a second task set associated to an emergency operation mode; and the method further comprises the step of transmitting information provided from the second task set to the graphics processing device in response to the detected at least one fault condition.

13. The method according to claim 12, wherein the method comprises the further step of:

configuring configurable bits of the graphics driver determining a client data priority associated to each of the first and second task set, wherein the client data priority associated to the second task set is configured to be higher than the client data priority associated to the first task set.

14. The method according to claim 12, wherein the method comprises the further steps of:

providing information from the first task set to said second set task set;

transmitting from the second task set the information provided from the first task set to the graphics driver; and transmitting information from the second task set to the graphics processing device and discarding the information provided from the first task set in response to the detected at least one fault condition.

15. The method according to claim 12, wherein the step of processing in the display processing device a first task set associated to a normal operation mode and in parallel processing a second task set associated to an emergency operation mode comprises the further step of processing the first task set arranged in a first partition having a certain amount of memory in a certain memory region and a certain CPU time allocated to it and processing the second task set arranged in a second partition having a certain amount of memory a certain memory region and a certain CPU time allocated to it.

16. A non-transitory computer program product stored on a computer readable media for performing the method steps of claim 12 when the computer program product is run on a computer.

\* \* \* \* \*